United States Patent [19]
Hartmann et al.

[11] Patent Number: 4,637,877
[45] Date of Patent: Jan. 20, 1987

[54] FILTER DISC

[75] Inventors: Wilhelm U. Hartmann, Sepulveda; James A. Martin, Sylmar, both of Calif.

[73] Assignee: HR Textron Inc., Valencia, Calif.

[21] Appl. No.: 771,925

[22] Filed: Sep. 3, 1985

[51] Int. Cl.⁴ ............................................. B01D 23/00
[52] U.S. Cl. .................................. 210/347; 210/487; 55/484; 55/523
[58] Field of Search ................. 55/482, 483, 484, 514, 55/521, 523; 210/487, 488, 346, 347, 483, 486

[56] References Cited

U.S. PATENT DOCUMENTS

| | | | |
|---|---|---|---|
| 3,504,422 | 4/1970 | Thalman | 55/527 |
| 3,581,902 | 6/1971 | Bidler | 210/486 |
| 3,666,107 | 5/1972 | Boggs et al. | 210/347 |
| 3,702,659 | 11/1972 | Clark | 210/347 |

FOREIGN PATENT DOCUMENTS 0090383 10/1983 European Pat. Off. ............ 210/485

Primary Examiner—Bernard Nozick
Attorney, Agent, or Firm—Nilsson, Robbins, Dalgarn, Berliner, Carson & Wurst

[57] ABSTRACT

A disc-shaped stainless steel filter element including filter media formed from air-laid randomly disposed sintered fibers secured to a hub. The filter media includes opposed sheets of the fibers having perforated plate means therebetween to allow flow from the outside in. The plate means and the fiber sheets are welded together at the outer periphery thereof and the fiber sheets are welded at their inner periphery to the hub.

4 Claims, 4 Drawing Figures

FILTER DISC

BACKGROUND OF THE INVENTION

The present invention relates generally to stainless steel filter elements and more particularly to a disc-shaped all stainless steel filter element having filter media formed from air-laid, randomly disposed sintered fibers secured to a solid stainless steel hub arranged to accommodate fluid flow from outside to inside through the filter media.

It is well known in the prior art to provide filters utilizing filter elements in the form of discs which are stacked one upon the other within the filter housing. It is also known in the prior art to construct the filter elements of stainless steel to accommodate high temperature, highly corrosive operating environments. It has, however, been found that to manufacture such structures in accordance with the prior art only sintered powder stainless steel filter media have been successfully employed. Such filter media, though operational under certain conditions, have limitations which can be overcome through the utilization of randomly disposed air-laid stainless steel fibers which have been sintered. However, such filter media could not, in accordance with the teachings of the prior art, be successfully attached to the solid central hub as required for these applications.

SUMMARY OF THE INVENTION

An improved disc-shaped stainless steel filter element having a solid stainless steel hub with a radially extending peripheral flange and a plurality of radial passageways extending through the hub with a disc-shaped stainless steel filter media pack disposed over the flange and permanently secured to the hub by welding.

DETAILED DESCRIPTION

Figure 1:
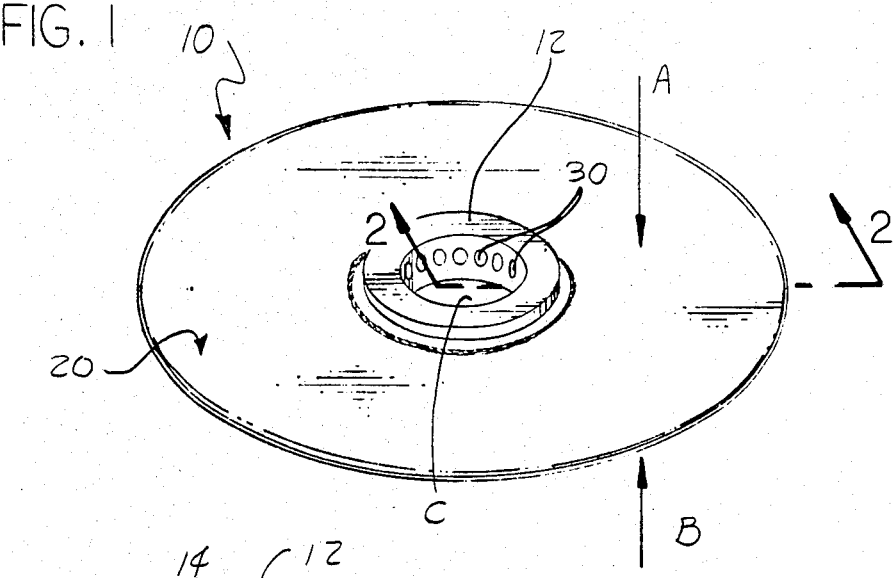
FIG. 1 is a perspective view of a filter element constructed in accordance with the principles of the present invention.
Figure 2:
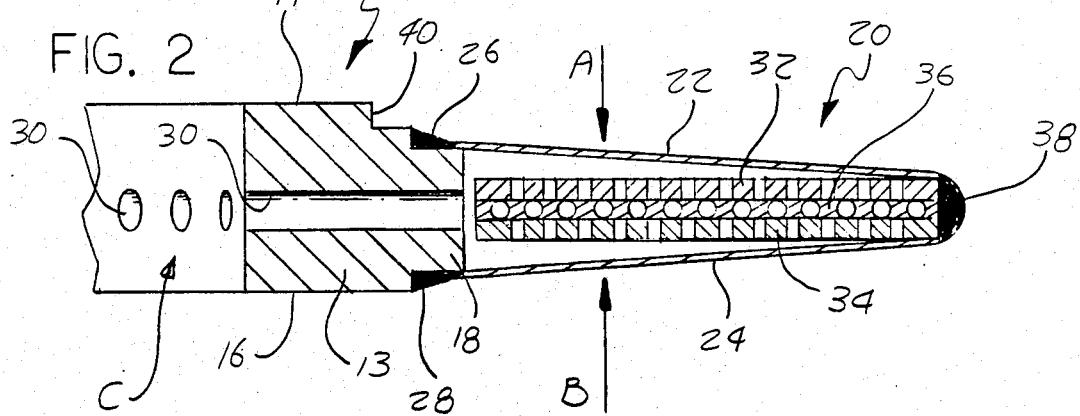
FIG. 2 is a fragmented cross sectional view taken about the lines 2—2 of FIG. 1.

As is shown in the drawings, a filter element 10 constructed in accordance with the present invention includes a solid hub 12 having filter media permanently secured thereto in the absence of adhesives to thereby form a disc-shaped filter element which is adapted to be stacked one on top of the other so that fluid to be filtered may flow from the outside inwardly as shown by the arrows A and B through the filter media 20 through openings 30 provided in the hub 12 and into the central opening C provided in the hub and thence outwardly through an appropriate conduit (not shown). As will be appreciated by those skilled in the art, the stacked filter elements would be contained within an appropriate housing having the desired inlets and outlets and/or manifolds as needed according to any particular application. Such overall construction of the filter including the housing, manifolds, conduits and the like form no part of the present invention which is directed specifically to the specific construction of the improved filter element.

The hub 12 includes a body 13 having opposite surfaces 14 and 16. A peripheral flange 18 extends around the body 13 of the hub 12. The filter media 20 includes first and second circular members or sheets 22 and 24 of filter media having appropriate openings therein so that the sheets 22 and 24 may fit over the flange 18 adjacent the surfaces 14 and 16 thereof. The sheets 22 and 24 of filter media are secured by fusion welding as shown at 26 and 28 to the body 13 in the absence of adhesives.

The filter media 22 and 24 is constructed of air-laid, randomly disposed stainless steel fibers which have been sintered and then laminated between appropriate woven wire support material. Such construction is fully disclosed in U.S. Pat. No. 3,504,422 which is incorporated herein by this reference.

A pair of stainless steel perforated plates 32 and 34 have sandwiched between them a spacer 36 constructed of a stainless steel wire screen. The combination of the sheets of filter media 22 and 24 along with the plates 32 and 34 and the screen 36 are all welded together at their outer periphery as shown at 38 by fusion welding and in the absence of any adhesive. The welds 26, 28 and 38 provide a leak-proof seal of the filter media to the solid hub 12, thereby forming the filter element. The spacer 36 along with the plates 32 and 34 prevent the filter media 22 and 24 from collapsing as a result of the pressure applied by the filtrant across the outer surfaces as indicated by the arrows A and B and thus with the perforations provided in the plates 32 and 34 along with the voids provided within the spacer 36, maintain the integrity of the flow path for the filtrant after filtering thereof as it flows through the radially extending passageways 30 and into the opening C.

The body 13 also provides a continuous shoulder 40 on the surface 14 thereof to receive a metallic O-ring thereby sealing the stacked discs to prevent leakage of the filtrant into the openings C as is well known to those skilled in the art.

Figure 3:
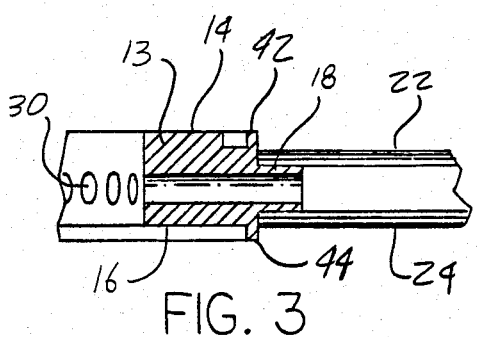
FIGS. 3 and 4 are partial cross sectional views illustrating cons of a filter element in accordance with the principles of the present invention.
Figure 4:
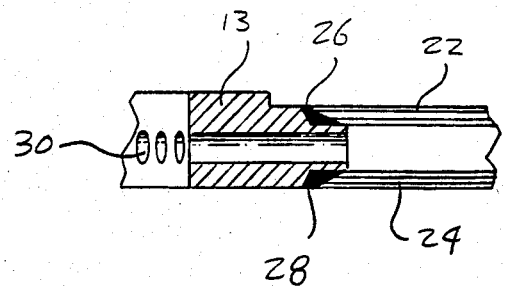

Referring now more particularly to FIGS. 3 and 4, the manner of construction of the element above-described is further illustrated. As is therein shown the body 13, prior to affixation of the filter media thereto is constructed to provide first and second circular beads 42 and 44 extending around the entire circumference of the body 13. The circular beads 32 and 44 may be viewed as providing a continuous longitudinally extending rib protruding outwardly from the surfaces 14 and 16, respectively. Once the filter media 22 and 24 is slipped over the flange 18 and abuts the outer surface of the beads 42 and 44, appropriate heat is applied to the circular beads 42 and 44 to melt the same and to cause the beads to flow into contact with the inner edges C of the media 22 and 24, thereby fusing the melted material of the bead into and with the edges of the media 22 and 24, thereby providing a continuous fusion weld 26 and 28 without the addition of any material of any type. As a result, a leak-proof seam and connection is provided between the hub 12 and the filter media 20, thus providing a new and improved stainless steel filter disc with the filter media constructed of air-laid, randomly disposed sintered fibers.

What is claimed is:

1. disc-shaped stainless steel filter element for filtering fluid flowing from outside to inside thereof and including filter media of randomly disposed stainless steel sintered fibers comprising:

a solid stainless steel hub including a body defining a central opening therethrough and having
first and second spaced apart surfaces,
a radially extending peripheral flange,
a plurality of radial passageways extending through said body including said flange;
first and second layers of sintered stainless steel ramdomly disposed fiber filter media disposed over said flange and extending radially outwardly from the periphery of said first and second spaced apart surfaces respectively; and
a stainless steel spacer means disposed between said media layers, said layers and said spacer means being continuously fusion welded together about the outer periphery thereof, said layers of said media being continuously fusion welded to said flange at said first and second surfaces.

2. A filter element as defined in claim 1 wherein said media is secured to said body by fusion welding where no material other than said hub and said media are used.

3. A filter element as defined in claim 2 wherein said body further includes an integral continuous bead extending from each said face adjacent said flange for providing material for said fusion weld.

4. A filter element as defined in claim 3 wherein said spacer means included first and second perforarated plates having a wire mesh sandwiched therebetween.

* * * * *